(12) United States Patent
Millerd et al.

(10) Patent No.: US 7,675,628 B2
(45) Date of Patent: Mar. 9, 2010

(54) SYNCHRONOUS FREQUENCY-SHIFT MECHANISM IN FIZEAU INTERFEROMETER

(75) Inventors: James E. Millerd, Tucson, AZ (US); Michael North-Morris, Tucson, AZ (US)

(73) Assignee: 4D Technology Corporation, Tucson, AZ (US)

( * ) Notice: Subject to any disclaimer, the term of this patent is extended or adjusted under 35 U.S.C. 154(b) by 348 days.

(21) Appl. No.: 11/899,883

(22) Filed: Sep. 7, 2007

(65) Prior Publication Data
US 2008/0062428 A1 Mar. 13, 2008

Related U.S. Application Data

(60) Provisional application No. 60/842,754, filed on Sep. 7, 2006.

(51) Int. Cl.
*G01B 9/02* (2006.01)
(52) U.S. Cl. .................................................... 356/492
(58) Field of Classification Search ......... 356/484–487, 356/489, 491–493, 495
See application file for complete search history.

(56) References Cited

U.S. PATENT DOCUMENTS

| | | | |
|---|---|---|---|
| 4,872,755 A | 10/1989 | Kuchel et al. | |
| 6,717,680 B1 | 4/2004 | Kuchel | |
| 7,057,738 B2 | 6/2006 | Millerd et al. | |
| 7,230,717 B2 | 7/2007 | Brock et al. | |
| 2005/0046865 A1* | 3/2005 | Brock et al. | 356/495 |
| 2005/0200856 A1* | 9/2005 | Groot | 356/512 |
| 2008/0117436 A1* | 5/2008 | Altenberger et al. | 356/521 |

\* cited by examiner

*Primary Examiner*—Tarifur Chowdhury
*Assistant Examiner*—Jonathan M Hansen
(74) *Attorney, Agent, or Firm*—Antonio R. Durando

(57) ABSTRACT

An optical device for characterizing a test surface combines a Fizeau interferometer with a polarization frequency-shifting element. Two substantially collinear, orthogonally polarized beams having respective frequencies differing by a predetermined frequency shift are generated by the polarization frequency-shifting element and projected into the Fizeau optical cavity to produce a pair of test beams and a pair of reference beams, wherein the beams in each pair have orthogonal polarization states and have frequencies differing by the predetermined frequency shift. A second, substantially equal frequency shift is introduced in the Fizeau cavity on either one of the pairs of test and reference beams, thereby generating a four-beam collinear output that produces an interferogram without tilt or short-coherence light. The invention may also be implemented by reversing the order of the Fizeau cavity and the polarization frequency-shifting element in the optical train.

34 Claims, 4 Drawing Sheets

SYNCHRONOUS FREQUENCY-SHIFT MECHANISM IN FIZEAU INTERFEROMETER

RELATED APPLICATIONS

This application is based on and claims the priority of U.S. Provisional Application Ser. No. 60/842,754, filed Sep. 9, 2006.

BACKGROUND OF THE INVENTION

1. Field of the Invention

The invention relates in general to Fizeau interferometers for optical testing.

2. Description of the Related Art

Phase-shift interferometry is an established method for measuring a variety of physical parameters ranging from the density of gasses to the displacement of solid objects. An interferometric wavefront sensor employing phase-shift interferometry typically consists of a temporally coherent light source that is split into two wavefronts, a reference and test wavefront, that are later recombined after traveling different path lengths. The relative phase difference between the two wavefronts is manifested as a two-dimensional intensity pattern known as an interferogram. Phase-shift interferometers typically have an element in the path of the reference wavefront to introduce three or more known phase-steps or phase-shifts. By detecting the intensity pattern with a detector at each of the phase shifts, the phase distribution of the object wavefront can be quantitatively and rapidly calculated independent of the irradiance in the reference or object wavefronts.

Phase-shifting of the images can either be accomplished by sequentially introducing a phase-step (temporal phase-shifting), by splitting the beam into parallel channels for simultaneous phase-steps (parallel phase-shifting), or by introducing a high frequency spatial carrier onto the beam (spatial carrier phase-shifting). Parallel and spatial phase-shifting achieve data acquisition in times several orders of magnitude less than temporal phase-shifting, and thus offer significant vibration immunity. Several methods of parallel phase shifting have been disclosed in the prior art. Smythe and Moore (1983) and Koliopoulos (1993) describe a parallel phase shifting method where a series of conventional beam splitters and polarization optics are used to produce three or four phase shifted images onto as many cameras for simultaneous detection. A number of [U.S. Pat. No. 4,575,248 (1986), U.S. Pat. No. 5,589,938 (1996), U.S. Pat. No. 5,663,793 (1997), U.S. Pat. No. 5,777, 741 (1998), U.S. Pat. No. 5,883,717 (1999)] disclose variations of this method where multiple cameras are used to detect multiple interferograms. Several prior-art publications (Barrientos, Kwon, Schwider) and (U.S. Pat. No. 6,304,330 and U.S. Pat. No. 6,552,808) describe methods to simultaneously image three or more interferograms onto a single sensor.

Tobiason et. al. (U.S. Pat. No. 6,850,329 and U.S. Pat. No. 6,847,457) and Brock et. al. in U.S. Pat. No. 7,230,717 describe spatial phase-shifting methods where a high frequency spatial pattern is encoded on the beam to effect simultaneous measurement without any significant division of the reference and test beams. These methods rely on orthogonally polarized reference and test beams and have the advantage of being true common-path arrangements. Distortions due to optical components such as zoom modules or beamsplitters do not affect the measurement accuracy.

Interferometers that have the test and reference surfaces located along the same optical axis (commonly known as Fizeau) offer advantages over other types of interferometers because they can be configured so that there are no elements between the test and reference surface. The Fizeau interferometer only requires one precision surface, which leads to greatly reduced manufacturing costs. Integrating a Fizeau interferometer with parallel or spatial phase-shifting techniques has proven somewhat difficult due to the need to encode opposite polarizations from reflections off nominally common optical path components and to a desire not to alter the surfaces or introduce an intra-cavity element. Sommargren (U.S. Pat. No. 4,606,638) teaches a method for absolute distance measurement that employs a Fizeau-type interferometer and uses a thin-film polarization reflection coating to separate the object and reference beams. However, the thin-film coating requires the incident and reflected wavefronts to be at a significant angle with respect to one another and only works over a narrow wavelength band. This significantly restricts the range at which the test optic can be placed, requiring the test and reference elements to be nearly in contact to avoid spatial separation between the wavefronts. In addition, it requires alteration of the cavity surfaces.

Millerd et al. (U.S. Pat. No. 7,057,738) describe a Fizeau interferometer that integrates a parallel phase-shifting sensor with a Fizeau interferometer. Tilt is used in the Fizeau interferometer cavity to either spatially separate the orthogonal polarization components for filtering on the receiving end, or to recombine orthogonal polarization components that were launched at different angles into the cavity. Introducing tilt in the Fizeau cavity in order to separate or combine the two polarization components has several undesirable consequences. First, the separate paths taken by the two polarizations can introduce aberrations into the measurement, particularly when using spherical reference optics. Second, it is necessary to spatially filter the beams at the imaging end to block unwanted polarizations. This reduces the number of tilt fringes that can be measured as well as the quality of the image.

In U.S. Pat. No. 4,872,755, Kuchel et al. proposed a method to provide orthogonally polarized reference and test beams in a Fizeau cavity without using tilt. By introducing an optical delay device in the measurement portion of the interferometer and judiciously selecting the coherence length of the light, the length of the delay path, and the length of the gap in the Fizeau cavity, two coherent test and reference beams as well as two incoherent beams are produced simultaneously. The delay device is used to vary the optical path difference between the two orthogonally polarized beams to ensure that they are still coherent with each other after the delay in the Fizeau cavity. Thus, the approach of Kuchel et al. requires fine adjustment of the length of the delay path, which is expensive and time consuming to implement. Kuchel (U.S. Pat. No. 6,717,680) also discloses an invention for eliminating stray reflections within an interferometer by modulating the Fizeau cavity with two external phase-shifters.

Finally, Brock et al. (U.S. Pat. No. 7,230,717) describe a spatial phase-shifting sensor integrated with a Fizeau interferometer using either a tilted beam arrangement with a long coherence source or an on-axis arrangement with a short coherence. While the combination of the spatial phase-shift sensor with either the tilted-beam Fizeau or delay-line Fizeau significantly extends the capability of each instrument, it does not overcome the inherent disadvantages of each. Therefore, there is still a need for a phase measurement system based on a Fizeau interferometer that does not suffer from the shortcomings of either the tilted beam or the short coherence approach.

SUMMARY OF THE INVENTION

The current invention realizes a Fizeau-cavity interferometer that is capable of quantitative measurement in a single shot (one camera frame integration time) without the need for tilt between beams within the cavity or the use of short coherence length sources. A laser with a coherence length equal to or longer than the cavity under test is launched into a polarization frequency shift device. The polarization frequency shift device applies a frequency shift to one polarization component of the beam relative to the orthogonal component. The two beams are recombined and are substantially overlapped and collinear. The recombined beam is optionally spatially filtered and expanded. The recombined beam is subsequently launched into a standard Fizeau cavity consisting of a reference and a test surface. The reference optic, typically a transmission flat or sphere, is translated in a direction substantially parallel to the incident optical beam, such that the reflected beam is imparted with a frequency shift equal in magnitude to the polarization frequency shift device.

The test beam is reflected from or transmitted through the test optic and redirected back into the interferometer. The combined test and reference beams are imaged onto a polarization phase-shifting sensor. The frequency shift is selected to produce at least one full cycle of phase shift during the integration time of the camera frame so that the fringes produced from each polarization within the Fizeau cavity have very low or no contrast, while the contrast of the fringes produced between the orthogonal polarization states remains high. Thus, the system functions as a single shot, polarization phase-shift interferometer. Both the reference and test beams remain on axis and precise path-matching within the interferometer is not required.

In the preferred embodiment of the invention the polarization frequency-shifter and the transmission flat/sphere translation device are driven by the same transducers (for example, piezo-electric stacks) so that the frequency shift imparted by each component is identical, regardless of the linearity of the transducers or the drive signal.

In the preferred embodiment a cat-eye or corner cube retroreflector is used in the polarization frequency-shifter to ensure the beams are always co-aligned regardless of small fluctuations on the input beam.

In another embodiment, a laser source with a periodic coherence function having a repeat length $L_c$ is used. A delayline is employed in the optical frequency shift device and adjusted to be equal to the Fizeau cavity length minus an integer number of $L_c$. This ensures that the fringe contrast remains high regardless of the cavity distance. The advantage of utilizing a source with periodic coherence is that higher laser powers, and thus shorter integration times, can be readily achieved.

Various other aspects and advantages of the invention will become clear from the description in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

DESCRIPTION OF THE PREFERRED EMBODIMENTS

The heart of the invention lies in the recognition that the combination of a polarizing frequency-shifting component with a Fizeau interferometer adapted to produce the same frequency shift can be used advantageously to produce interferograms with orthogonally polarized beams without tilt or the use of short-coherence sources. As used herein, the terms "test surface" and "test object" are mostly used throughout to refer to the surface or object typically placed in a Fizeau interferometer for optical characterization. However, it is understood that a test surface or test object could refer as well to any medium (such as air, water, or glass) being measured for refractive index in-homogeneity in a Fizeau cavity. Therefore, the scope of the invention should be so construed.

Figure 1:
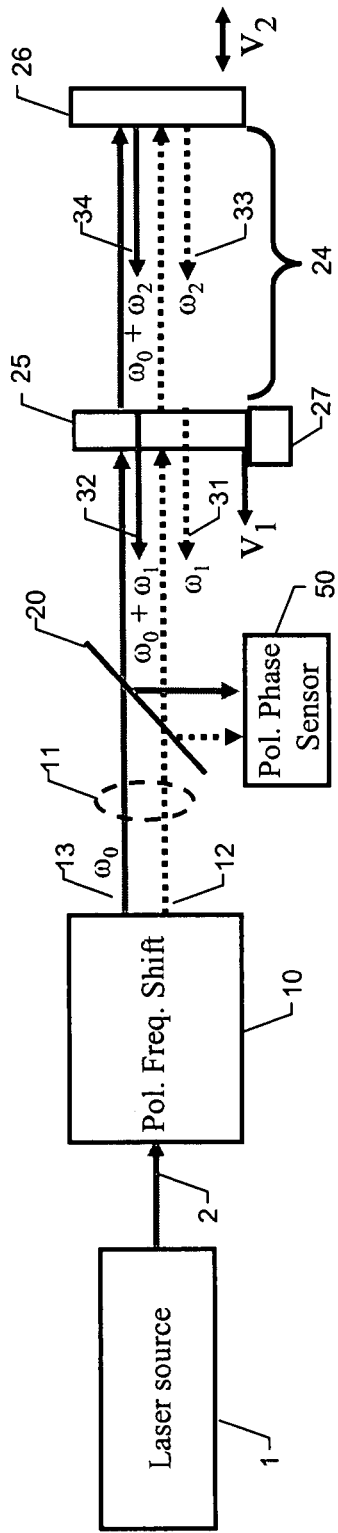
FIG. 1 is a schematic representation of the optical train of a Fizeau interferometer for testing surfaces according to the invention.

Referring to FIG. 1, a collimated laser source 1 produces a beam 2 that is directed to a polarization frequency-shifting element 10. The polarization frequency-shifting element 10 produces an unshifted beam 12 having a defined polarization state and a frequency-shifted beam 13 having a frequency shift of $\omega_0$ and a polarization state that is orthogonal with respect to the unshifted beam 12. For example, the polarization of the unshifted beam 12 could be horizontal linear, while the frequency-shifted beam could be vertical linear. The unshifted beam 12 and frequency-shifted beam 13 are substantially overlapped and collinear and can be represented as a combined beam 11. The two beams are drawn separated in FIG. 1 for clarity.

The combined beam 11 is directed through a beamsplitter 20 to a Fizeau optical cavity 24 that consists of a partially reflective mirror 25 and a return mirror 26. One of the two mirrors, preferably the partially reflective mirror 25, is driven by a transducer 27 at a velocity $v_1$ in a direction substantially parallel to the incident combined beam 11. The beams reflected from the partially reflective mirror are shifted by a frequency $\omega_1$ due to the velocity of the mirror according to the Doppler shift $$\omega_1 = 4\pi v_1/\lambda, \quad (1)$$

where $\lambda$ is the nominal wavelength of the laser light. Thus, the unshifted beam 12 is reflected from the partially reflective mirror 25 to produce a first reflected beam 31 that has a frequency shift of $\omega_1$. The frequency shifted beam 13 is reflected from the partially reflective mirror 25 to produce a second reflected beam 32 that has a frequency shift of $\omega_0+\omega_1$.

The beams reflected from the nominally stationary return mirror 26 are reflected with frequency shift $\omega_2$ due to vibration in the test setup. In general, the frequency shift due to vibration will be time dependent, but for short integration times it can be approximated as constant. Therefore, the unshifted beam 12 is reflected from the return mirror 26 to produce a third beam 33 with a net frequency shift of $\omega_2$. The frequency-shifted beam 13 is reflected from the return mirror 26 to produce a fourth beam 34 with a net frequency shift of $\omega_0+\omega_2$.

The four beams, 31, 32, 33 and 34 are reflected by beamsplitter 20 and directed to a polarization phase-shift module 50 that contains one or more polarizers that create interference fringe patterns from the orthogonally polarized beams and a camera that operates with a frame integration time T to spatially measure the intensity pattern.

If the frequency shift produced by the relative motion of mirror 26 from vibration multiplied by the integration time T of the camera frame is sufficiently small, the contribution of $\omega_2$ can be neglected; that is, when $$\omega_2 T \ll 2\pi. \qquad (2)$$

For synchronous operation, the relative frequency shifts are selected such that $\omega_0 = +/- \omega_1$. (That is, $\omega_0$ and $\omega_1$ are equal in magnitude—absolute value—regardless of sign.) In either case, one of the beams reflected from the partially reflective mirror 25 and one of the beams reflected from the return mirror 26 will have the same base frequency shift (either both equal to zero or both=$\omega_0$) and will produce a temporally stable interference fringe pattern on the camera. The other two beams will differ in frequency by $2\omega_0$ and will produce a moving fringe pattern. For example, if $\omega_0 = +\omega_1$, the first reflected beam 31 and the fourth reflected beam 34 will each have a frequency shift equal to $\omega_0$. At the same time, the second reflected beam 32 will have a frequency shift of $2\omega_0$ and the third reflected beam 33 will have no frequency shift. By selecting the frequency shift $\omega_0$ and the camera integration time T such that $$\omega_0 T = n2\pi, \qquad (3)$$

the fringes resulting from the interference of all beams will produce zero contrast, except for the first reflected beam 31 and the fourth reflected beam 34 that will oscillate through an integer number of cycles during the camera integration time T and, therefore, will produce fringes.

Thus, the detected contrast of the interference fringes produced by all beams will be zero except for the pattern produced by the two desired beams. The system may also include imaging optics as necessary to relay an image of the object under test back to the sensor plane.

Figure 2:
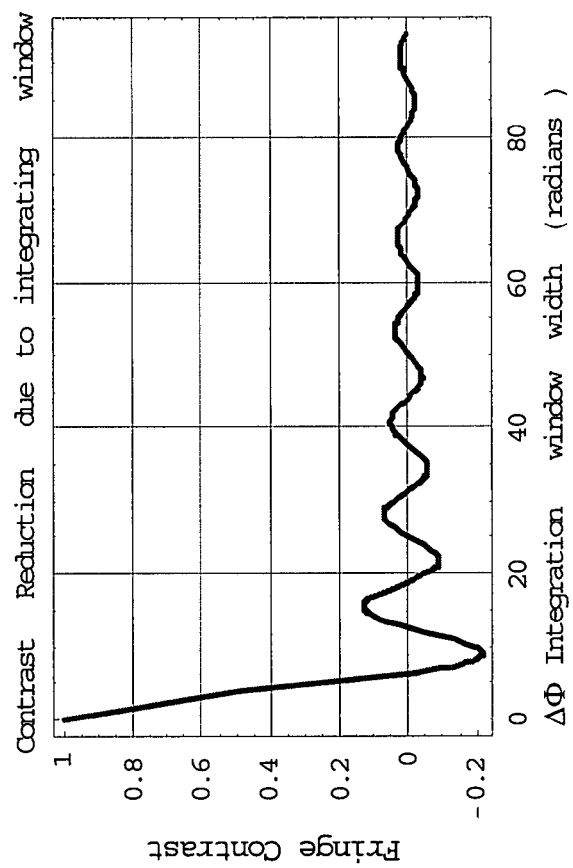
FIG. 2 is a plot of fringe contrast versus integration window width.

The contrast or fringe visibility of the unwanted fringe patterns can be calculated by the relation $$(\text{Contrast}) \sim V = \sin(\Delta\Phi)/\Delta\Phi, \qquad (4)$$

where $\Delta\Phi = \omega_0 T/2$ is the integrated phase. FIG. 2 illustrates the fringe visibility of the unwanted patterns as a function of the integrated phase. By adjusting either the frequency shift $\omega_0$ or the integration period T, the function can be tuned to a minimum using Equation 3. As seen in FIG. 2, this condition, when met, produces zero contrast irrespective of the size of the integration time T. However, for large values of integrated phase, the sensitivity to tuning is significantly reduced irrespective of whether or not the condition of Equation 3 is met. For example, with a mirror velocity $v_1=10$ mm/second, a wavelength of 633 nm, and a camera integration time of 1 millisecond, the integrated phase becomes 100 radians. From FIG. 2 it can be seen that in the neighborhood of 100 radians the fringe contrast is nearly zero even if the integrated phase is not tuned exactly to an integer value of $2\pi$. This means that in practice exact tuning of the frequency shift or integration period is not necessary for good operation. In addition, under the condition of large values of integrated phase, the restriction on relative motion of the test optic (Equation 2) can be relaxed to $$\omega_2 T < \pi. \qquad (5)$$

Under this restriction, relative motion of the cavity due to vibration only decreases the measured fringe contrast, but it does not introduce a significant phase-shift error in the measurement. Therefore, a large amount of relative motion can be tolerated during the integration time of the camera. In comparison, with a standard temporal phase-shift interferometer where the typical acquisition time is 120 ms, the integrated phase due to relative vibration motion must not exceed $-\pi/10$ in order to keep the relative phase-shift error between frames small. The present invention, with the design examples given here, provides a 1200 times improvement in vibration tolerance over standard techniques. Higher frequency shifts and shorter camera integration times can further increase the vibration tolerance.

Figure 3:
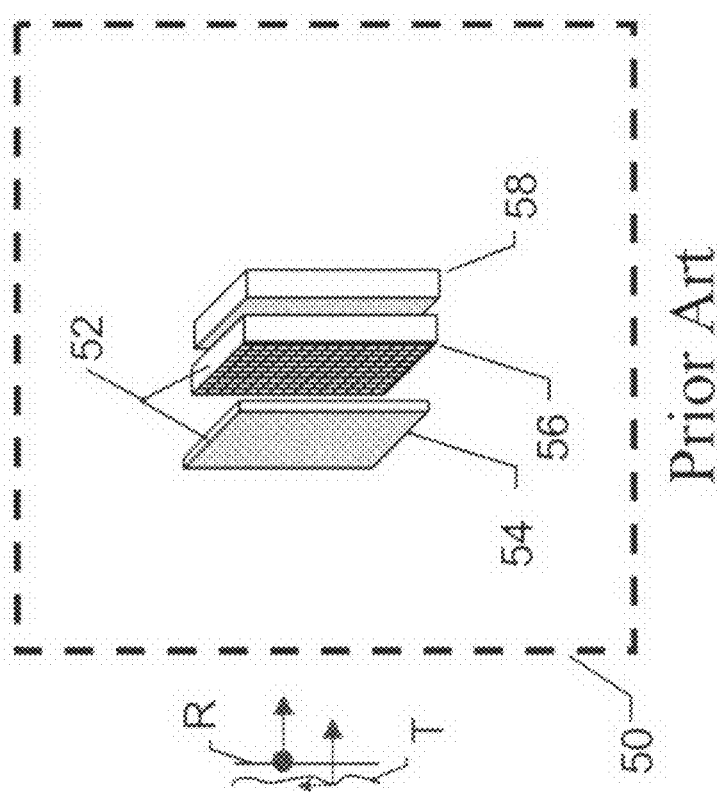
FIG. 3 shows a preferred embodiment of polarization phase-shift sensor using a pixelated phase mask.

FIG. 3 shows a preferred embodiment of the polarization phase-shift sensor 50 using a pixelated phase-mask from the prior art. See co-owned U.S. Pat. No. 7,230,717. The sensor consists of an optional quarter-wave plate 54 to convert linear polarization to circular polarization, a pixelated phase-mask 56, which may be bonded together with the quarter-wave plate 54, to make a combined phase-mask 52, and a camera sensor 58 such as a CCD or CMOS array. (As used herein, "camera sensor" is intended to cover any detector suitable for sensing and measuring the signal received from the optical device, whether consisting of a single or multiple components, such as sensors consisting of multiple adjacent sensor elements.) The combined phase-mask 52 is registered with respect to and may be bonded to the camera sensor 58.

Figure 4:
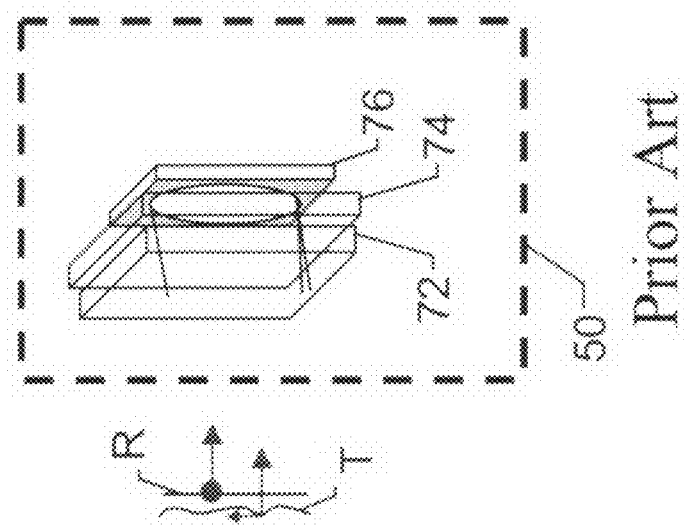
FIG. 4 shows another embodiment of polarization phase-shift sensor using a spatial carrier sensor.

FIG. 4 shows another embodiment of the polarization phase-shift sensor 50 using a spatial carrier sensor from the prior art. The sensor consists of a Wollaston prism 72 to separate the two orthogonal polarizations by a small angle, a polarizer 74 to interfere the two beams and produce a high-frequency spatial carrier fringe pattern, and a camera sensor 76 such as a CCD or CMOS array to detect the interference pattern. Many other embodiments for spatial and parallel polarization phase-sensors, as noted from the prior art, are also possible.

Figure 5:
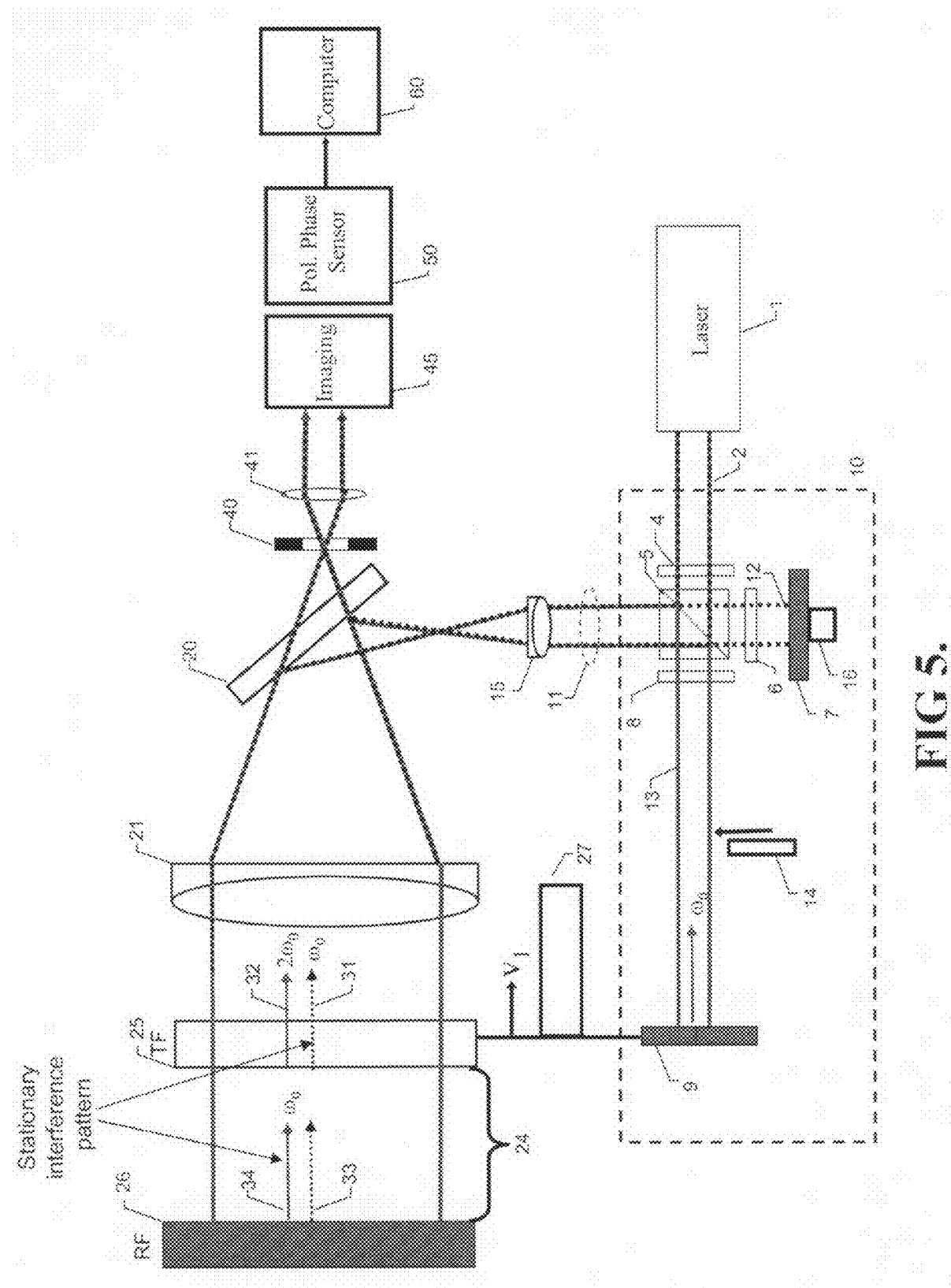
FIG. 5 shows a schematic representation of a Fizeau interferometer measurement system according to the present invention.

FIG. 5 shows a schematic representation of a Fizeau interferometer measurement system according to the invention. A long coherence laser source 1 produces a beam 2 that is directed to a polarization frequency-shifting element 10. In this embodiment, the polarization frequency-shifting element 10 consists of a half-wave plate 4 for adjusting the beam balance and a polarization beamsplitter 5 that splits the beam into two orthogonal-polarization components. The vertical linear polarized component of the incident beam 2 is directed through a first quarter-wave plate 6 and becomes circularly polarized, reflected off a stationary mirror 7, transmitted back through the first quarter-wave plate 6 (thus becoming horizontally polarized), and transmitted through the polarization beamsplitter 5. The horizontal linear polarized component of the incident beam 2, shown as the frequency-shifted beam 13, is transmitted through the polarization beamsplitter 5, transmitted through the second quarter-wave plate 8 (becoming circularly polarized), reflected from moving mirror 9 that moves substantially parallel to the incident beam and imparts a frequency shift $\omega_0$, retransmitted through the second quarter-wave plate converting the polarization to linear vertical, and reflected from the polarization beamsplitter cube 5 to be combined with the unshifted beam 12.

Preferred embodiments for the moving mirror 9 and the stationary mirror 7 are corner cubes or cats-eye reflectors which make the overlap and co-linearity of the combined beam 11 insensitive to small fluctuations of the input beam or tilt of the mirrors.

The combined beam 11 is expanded with a first lens 15, reflected off a non-polarizing beamsplitter 20, recollimated by a second lens 21, and launched into the Fizeau cavity 24 that consists of a partially reflective mirror 25 and a return mirror 26. The partially reflective mirror 25 is driven by transducers 27 at a velocity $v_1$ in a direction substantially parallel to the incident combined beam 11. The beams reflected from the partially reflective mirror are shifted by a frequency $\omega_0$ due to the velocity of the mirror.

In one embodiment of the invention, both the partially reflecting mirror 25 and the moving mirror 9 are driven by the same transducer(s) 27. This ensures that the frequency shift produced by each element is identical regardless of the transducer response and drive signal linearity.

The unshifted beam 12 is reflected from the partially reflective mirror 25 to produce a first reflected beam 31 that has a frequency shift of $\omega_0$. The frequency-shifted beam 13 is reflected from the partially reflective mirror 25 to produce a second reflected beam 32 that has a frequency shift of $2\omega_0$.

The unshifted beam 12 is reflected from the stationary return mirror 26 to produce a third beam 33 without a frequency shift. The frequency-shifted beam 13 is reflected from the return mirror 26 to produce a fourth beam 34 with a frequency shift of $\omega_0$. The four beams 31, 32, 33, 34 are focused by the second lens 21, transmitted through the beamsplitter 20, optionally filtered by an aperture 40 to block any stray reflections, recollimated by lens 41, transmitted through an imaging module that may include zoom optics to scale the image, and are incident on the polarization phase sensor 50. Electronic signals from the polarization phase sensor 50 are sent to a computer for analysis and display. By selecting the mirror velocity and the camera integration time appropriately, the fringes produced by the interference between all the beams except the first reflected beam 31 and the fourth reflected beam 34 will oscillate through an integer number of cycles during the camera integration time T and produce zero contrast.

The laser source may be selected with a periodic coherence function having a repeat length $L_c$. For example, a multimode helium-neon laser typically has a periodic coherence function where $L_c$ is equal to twice the tube length. By moving mirrors 9 and 7 relative to each other (such as by adding an additional translation mechanism 16, as seen in FIG. 5) to adjust the relative lengths of the paths of the frequency-shifted beam 13 and the non-shifted beam 12 (i.e., the optical path difference between the two), it is possible to achieve good temporal coherence of the reflected beams from the Fizeau cavity. The relative delay necessary is given by $$\Delta L = L_f - (n/2) L_c, \quad (6)$$

where $L_f$ is the cavity length of the Fizeau cavity and n is selected to be the largest integer that still produces a positive difference. The advantage of utilizing a source with periodic coherence is that higher laser powers, and thus shorter integration times, can be readily achieved at a modest cost.

In order to reduce any residual phase-dependent systematic measurement errors, a phase-shifting device (such as the translation mechanism 16 of FIG. 5) is preferably incorporated in the polarization frequency-shifting element 10, as shown in FIG. 5, to introduce predetermined or random phase offsets between the frequency-shifted beam 13 and the unshifted beam 12. Multiple measurements are made, each with the predetermined or random phase offset, and the measurements are subsequently averaged to provide a more accurate measurement. This technique of measurement-error reduction is described in detail in co-owned U.S. Pat. No. 7,079,251, hereby incorporated by reference.

Figure 6:
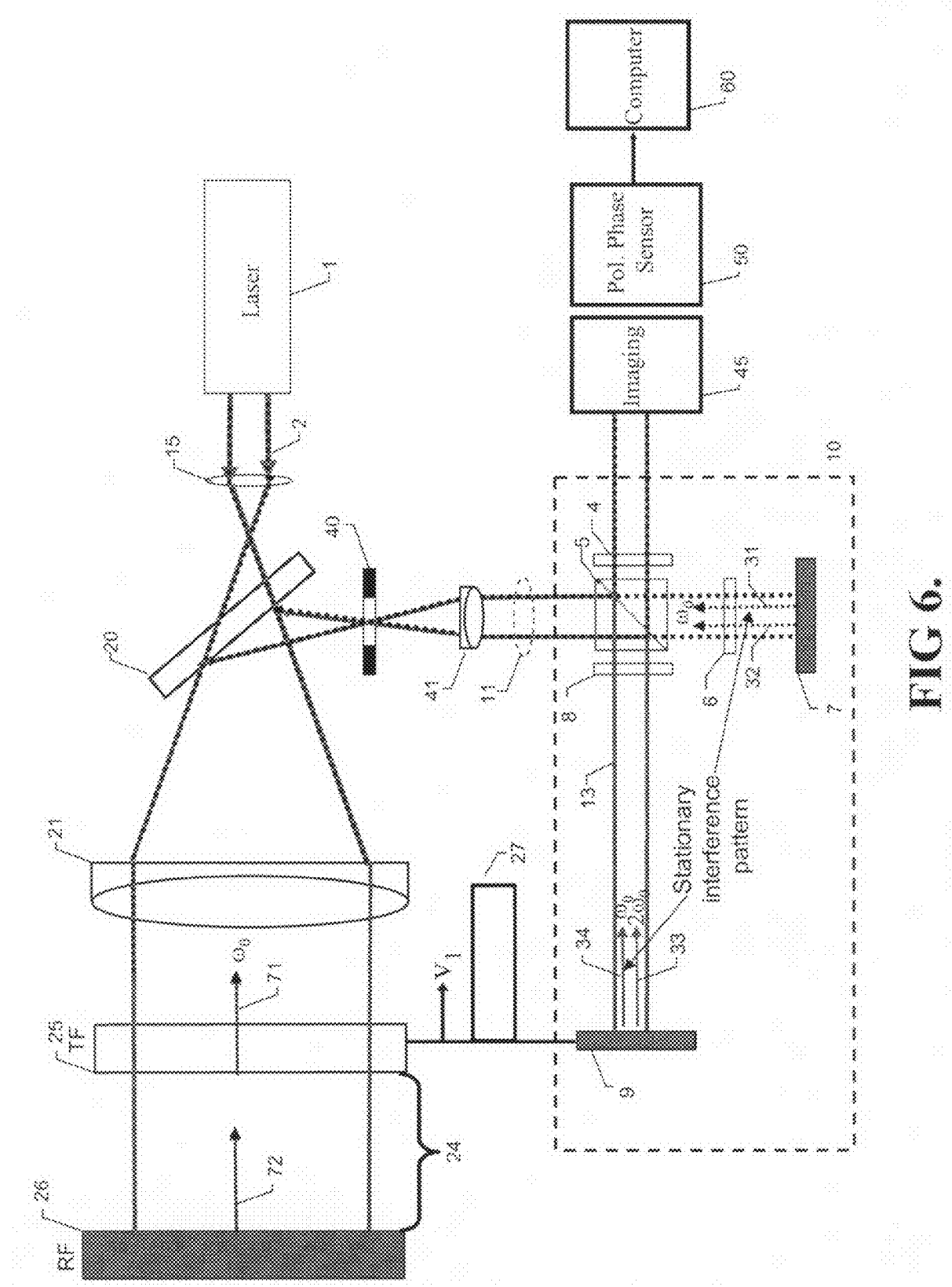
FIG. 6 is another embodiment of the invention wherein a long coherence laser source produces an incident beam that is first expanded and then directed into the Fizeau cavity.

In another embodiment of the invention, shown in FIG. 6, a long coherence laser source 1 produces an incident beam 2 that is first expanded by lens 15 and lens 21, and then is directed into a Fizeau cavity 24 that consists of a partially reflective mirror 25 and a return mirror 26. The partially reflective mirror 25 is driven by transducers 27 at a velocity $v_1$ in a direction substantially parallel to the incident beam 2. The beam reflected from the partially reflective mirror is shifted by a frequency $\omega_0$ due to the velocity of the mirror, while the beam reflected from the return mirror 26 is unshifted. The reflected beams are reflected again by a non-polarizing beamsplitter 20, recollimated by a lens 41, and launched into to a polarization frequency-shifting element 10 where a differential frequency shift is imparted between the two polarization states synchronously with the Fizeau cavity. The beams exiting the polarization frequency-shifting element 10 are directed to an imaging module that may include zoom optics to scale the image, and are incident on polarization phase sensor 50. Electronic signals from the polarization phase sensor 50 are sent to a computer for analysis and display. This embodiment is somewhat less desirable because of the need to image through the polarization frequency-shifting element 10.

In still another embodiment, not shown, the return mirror 26 could be moved synchronously with the polarization frequency shifting element 10 to produce an equivalent interference between selected polarization components, while the partially reflecting mirror 25 is left stationary.

Another advantageous feature of the present invention is that the interferometer can function as a standard temporal phase-shifting Fizeau interferometer by blocking one of the two arms in the frequency-shifting module 10 (such as by using a beam block 14, as shown in FIG. 5) and by tuning the transducers 27 such that the displacement of the partially reflecting mirror 25 is equal to a predetermined fraction of a wavelength between frames (e.g., $\lambda/8$). This has the advantage of allowing higher spatial resolution for applications where rapid phase measurement is not required. It also affords a convenient method to calibrate the system and measure any residual errors that may exist due to polarization aberrations in the optics. Because the transducers 27 are capable of high velocity motion, rapid temporal phase shifting can be achieved by utilizing a high frame rate camera, thus affording some additional vibration immunity over standard camera frame rate interferometers.

A second method for calibrating any residual errors is to make measurements using only the two orthogonally polarized beams 31 and 32 reflecting from the transmission reference optic 25. This can be accomplished by blocking the return from the test part 26, either by mechanical attenuation or by adjusting the angle of the test part so that the return beam does not pass through the aperture 40. The frequency shifting mechanism 27 is switched off so that the frequency-shifted beam 13 is substantially the same frequency as the unshifted beam 12, allowing the two beams to produce a stable interference pattern when combined at the polarization phase sensor 50. Since both beams are reflected from the same surface of the transmission test optic 25, only the polarization aberrations in the interferometer due to such things as residual birefringence in the transmission optics and polarization dependent phase-shift from reflecting optics are measured. This can be recorded in software and digitally subtracted from subsequent measurements to produce a calibrated surface map.

As those skilled in the art will readily understand, the various optimal operating conditions described above are relevant only during the integration time T of the sensor. That is, the speed of the mechanism producing the frequency shifts (such as a transducer operating on both a mirror in the Fizeau cavity and a mirror in the polarization frequency-shifting element) needs to be synchronized only during the integration time, thereby facilitating the practical implementation of the invention by overlapping the data acquisition time with the appropriate segment of the transducer's travel.

Therefore, while the present invention has been shown and described herein in what is believed to be the most practical and preferred embodiments, it is recognized that departures can be made therefrom within the scope of the invention, which is not to be limited to the disclosed details but is to be accorded the full scope of the claims to embrace any and all equivalent methods and products.

We claim:

1. An optical device for characterizing a test object opposite to a reference surface in a Fizeau optical cavity, comprising:
   a polarization frequency-shifting element operating on an input beam to generate two orthogonally polarized beams having respective frequencies differing by a first frequency shift;
   means for projecting said two beams toward said Fizeau optical cavity to produce a pair of test beams and a pair of reference beams, wherein said beams in each pair have orthogonal polarization states and have frequencies differing by said first frequency shift;
   means for producing a second frequency shift on either one of said pairs of test and reference beams;
   means for combining said pairs of test and reference beams to produce an interferogram after said second frequency shift has been introduced; and means for detecting and spatially sampling said interferogram;
   wherein said first frequency shift and said second frequency shift are substantially equal in magnitude;
   wherein said first frequency shift and said second frequency shift are produced by a mechanical transducer operating simultaneously on both the Fizeau optical cavity and the polarization frequency-shifting element.

2. The device of claim 1, wherein said polarization frequency-shifting element comprises a polarization beamsplitter and two quarter-wave plates to produce said two orthogonally polarized beams and a moving mirror to impart said first frequency shift between the orthogonally polarized beams.

3. The device of claim 1, wherein said second frequency shift is a Doppler shift produced by a mechanical transducer on either one of said pairs of test and reference beams in a direction substantially parallel to the pairs of test and reference beams.

4. The device of claim 1, wherein said means for detecting and spatially sampling the interferogram comprises a pixelated phase-mask, a camera sensor optically aligned with the pixelated phase-mask, and a quarter-wave plate optically aligned with the pixelated phase-mask.

5. The device of claim 1, wherein said means for detecting and spatially sampling said interferogram comprises a Wollaston prism, a polarizer and a camera sensor.

6. The device of claim 1, wherein said means for detecting and spatially sampling is operated such as to substantially meet a condition whereby $$\omega_0 T = n2\pi,$$

where T is integration time of a camera sensor and $\omega_0$ is said frequency shift.

7. The device of claim 2, wherein said input beam is characterized by a periodic coherence function having a repeat length; said polarization frequency-shifting element further includes a second, normally stationary mirror and means for translating said moving and normally stationary mirrors relative to one another; and an optical path difference between said orthogonally polarized beams is adjusted to optimize fringe contrast.

8. The device of claim 2, wherein said polarization frequency-shifting element further includes a phase shifting device to introduce phase offsets between said orthogonally polarized beams.

9. The device of claim 1, wherein said polarization frequency-shifting element further includes a blocking element to block one of said orthogonally polarized beams.

10. The device of claim 1, wherein said polarization frequency-shifting element comprises a polarization beamsplitter and two quarter-wave plates to produce said two orthogonally polarized beams and a moving mirror to impart said first frequency shift between the orthogonally polarized beams; said means for detecting and spatially sampling the interferogram comprises a pixelated phase-mask, a camera sensor optically aligned with the pixelated phase-mask, and a quarter-wave plate optically aligned with the pixelated phase-mask.

11. An optical device for characterizing a test object opposite to a reference surface in a Fizeau optical cavity, comprising, in combination:
   a light source projecting a light beam into said Fizeau optical cavity to produce a test beam and a reference beam;
   means for producing a first frequency shift between said test and reference beams;
   a polarization frequency-shifting element operating on said test and reference beams to generate two pairs of beams, said pairs being orthogonally polarized, and to produce a second frequency shift on either one of said pairs of beams;
   means for combining said two pairs of beams to produce an interferogram after said second frequency shift has been introduced; and
   means for detecting and spatially sampling said interferogram;
   wherein said first frequency shift and said second frequency shift are substantially equal in magnitude;
   wherein said first frequency shift and said second frequency shift are produced by a mechanical transducer operating simultaneously on both the Fizeau optical cavity and the polarization frequency-shifting element.

12. The device of claim 11, wherein said means for producing a first frequency shift between said test and reference beams is a mechanical transducer operating on either one of the test and reference beams in a direction substantially parallel to the test and reference beams.

13. The device of claim 11, wherein said polarization frequency-shifting element comprises a polarization beamsplitter and two quarter-wave plates to produce said two pairs of beams and a moving mirror to impart said second frequency shift on either one of said pairs of beams.

14. The device of claim 11, wherein said means for detecting and spatially sampling said interferograms comprises a pixelated phase-mask, a camera sensor optically aligned with the pixelated phase-mask, and a quarter-wave plate optically aligned with the pixelated phase-mask.

15. The device of claim 11, wherein said means for detecting and spatially sampling said interferogram comprises a Wollaston prism, a polarizer and a camera sensor.

16. The device of claim 11, wherein said means for detecting and spatially sampling is operated such as to substantially meet a condition whereby $$\omega_0 T = n2\pi,$$

wherein T is integration time of a camera sensor and $\omega_0$ is said frequency shift.

17. The device of claim 13, wherein said light source is characterized by a periodic coherence function having a repeat length; said polarization frequency-shifting element further includes a second, normally stationary mirror and means for translating said moving and normally stationary mirrors relative to one another; and an optical path difference between said orthogonally polarized beams is adjusted to optimize fringe contrast.

18. The device of claim 13, wherein said polarization frequency-shifting element further includes a phase shifting device to introduce phase offsets between said orthogonally polarized beams.

19. The device of claim 11, wherein said polarization frequency-shifting element further includes a blocking element to block one of said pairs of orthogonally polarized beams.

20. The device of claim 11, wherein said polarization frequency-shifting element comprises a polarization beamsplitter and two quarter-wave plates to produce said two pairs of beams and a moving mirror to impart said second frequency shift on either one of said pairs of beams; said means for detecting and spatially sampling said interferograms comprises a pixelated phase-mask, a camera sensor optically aligned with the pixelated phase-mask, and a quarter-wave plate optically aligned with the pixelated phase-mask.

21. An optical device for characterizing a test object opposite to a reference surface in a Fizeau optical cavity, comprising:
a combination including a Fizeau optical cavity comprising means for producing a frequency shift in a beam emitted by the cavity; and
a polarization frequency-shifting element capable of generating orthogonally polarized beams having respective frequencies differing substantially by said frequency shift;
said optical cavity and polarization frequency-shifting element being optically aligned so as to convert an input beam into a first pair of orthogonally polarized beams with substantially no relative frequency shift and into a second pair of orthogonally polarized beams with a relative frequency shift substantially equal to twice said frequency shift, thereby producing an output including four beams;
means for combining said output to produce an interferogram; and
means for detecting and spatially sampling said interferogram;
wherein said frequency shift is produced in the Fizeau optical cavity and the polarization frequency-shifting element by a mechanical transducer operating simultaneously on both the Fizeau optical cavity and the polarization frequency-shifting element.

22. The device of claim 21, wherein said means for producing a frequency shift is a mechanical transducer driving a reflective surface in the Fizeau optical cavity.

23. The device of claim 21, wherein said polarization frequency-shifting element comprises a polarization beamsplitter, two quarter-wave plates and a moving mirror to produce said orthogonally polarized beams having respective frequencies differing substantially by said frequency shift.

24. The device of claim 21, wherein said means for detecting and spatially sampling said interferogram comprises a pixelated phase-mask, a camera sensor optically aligned with the pixelated phase-mask, and a quarter-wave plate optically aligned with the pixelated phase-mask.

25. The device of claim 21, wherein said means for detecting and spatially sampling said interferogram comprises a Wollaston prism, a polarizer and a camera sensor.

26. The device of claim 21, wherein said means for detecting and spatially sampling is operated such as to substantially meet a condition whereby $$\omega_0 T = n2\pi,$$

wherein T is integration time of a camera sensor and $\omega_0$ is said frequency shift.

27. A method of characterizing a test object with a Fizeau interferometer comprising the following steps:
combining a Fizeau optical cavity that includes means for producing a frequency shift in a beam emitted by the cavity with a polarization frequency-shifting element capable of generating orthogonally polarized beams having respective frequencies differing by substantially said frequency shift;
aligning said optical cavity and polarization frequency-shifting element so as to convert an input beam into a first pair of orthogonally polarized beams with substantially no relative frequency shift and into a second pair of orthogonally polarized beams with a relative frequency shift substantially equal to twice said frequency shift, thereby producing an output including four beams;
combining said output to produce an interferogram; and
detecting and spatially sampling said interferogram;
wherein said frequency shift is produced in the Fizeau optical cavity and the polarization frequency-shifting element by a mechanical transducer operating simultaneously on both the Fizeau optical cavity and the polarization frequency-shifting element.

28. The method of claim 27, wherein said frequency shift is produced by a mechanical transducer driving a reflective surface in the Fizeau optical cavity.

29. The method of claim 27, wherein said polarization frequency-shifting element comprises a polarization beamsplitter, two quarter-wave plates and a moving mirror for producing said orthogonally polarized beams having respective frequencies differing by substantially said frequency shift.

30. The method of claim 27, wherein said step of detecting and spatially sampling said interferogram is carried out with a pixelated phase-mask, a camera sensor optically aligned with the pixelated phase-mask, and a quarter-wave plate optically aligned with the pixelated phase-mask.

31. The method of claim 27, wherein said step of detecting and spatially sampling said interferogram is carried out with a Wollaston prism, a polarizer and a camera sensor.

32. The method of claim 27, wherein said detecting and spatially sampling step is carried out such as to substantially meet a condition whereby $$\omega_0 T = n2\pi,$$

wherein T is integration time of a camera sensor and $\omega_0$ is said frequency shift.

33. The method of claim 29, wherein said input beam is characterized by a periodic coherence function having a repeat length; said polarization frequency-shifting element further includes a second, normally stationary mirror and means for translating said moving and normally stationary mirrors relative to one another; and further including the step of adjusting an optical path difference between said orthogonally polarized beams to optimize fringe contrast.

34. The method of claim 29, wherein said polarization frequency-shifting element further includes a phase shifting device to introduce phase offsets between said orthogonally polarized beams; and further including the steps of making multiple measurements with corresponding phase offsets, and of averaging said measurements to reduce measurement errors.

* * * * *